July 31, 1956 F. WASSER 2,756,498
DEVICE FOR SPREADING BUTTER OR THE LIKE
Filed Jan. 19, 1954
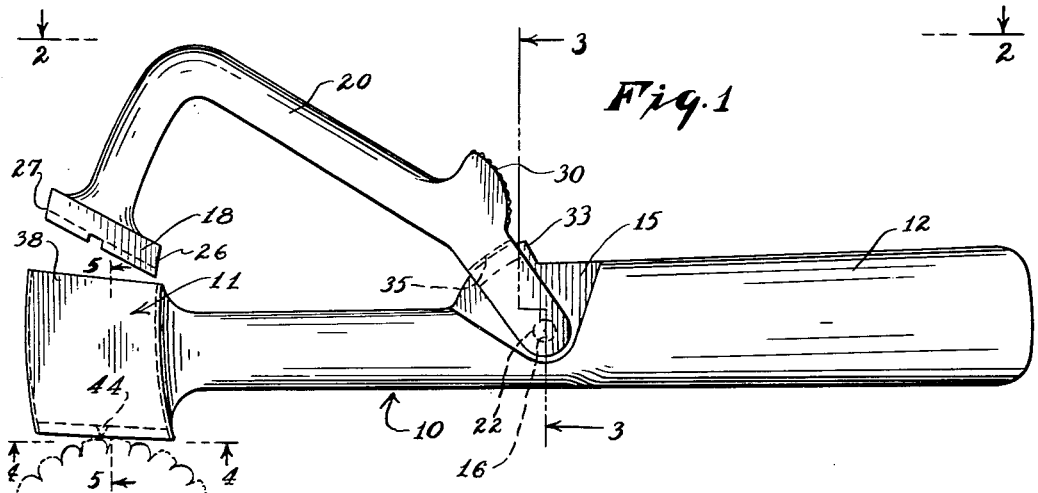
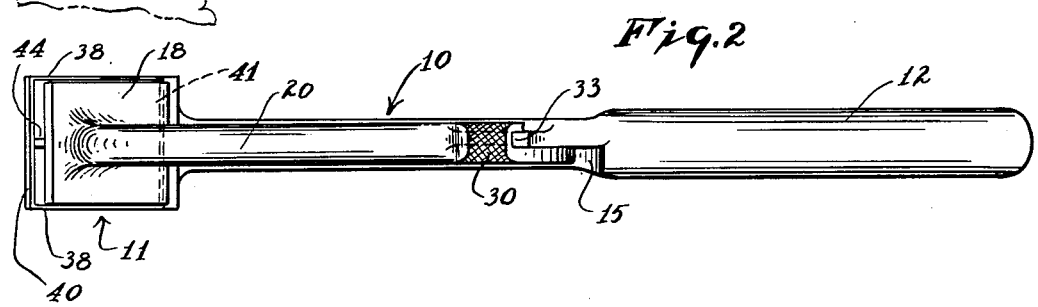
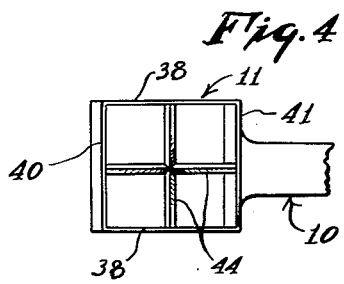
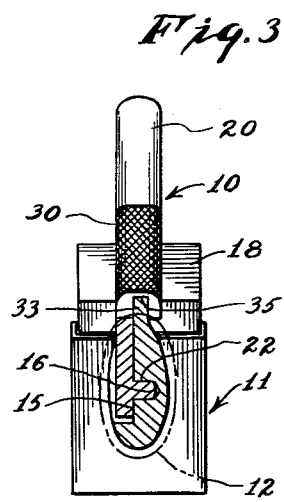
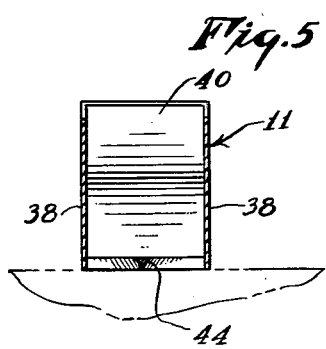
INVENTOR.
Fred Wasser
BY Emery, Varney, Whittemore & Dix
ATTORNEYS

United States Patent Office 2,756,498
Patented July 31, 1956

2,756,498

DEVICE FOR SPREADING BUTTER OR THE LIKE

Fred Wasser, Yonkers, N. Y.

Application January 19, 1954, Serial No. 404,986

7 Claims. (Cl. 30—130)

This invention relates to apparatus for spreading material, such as butter, on ears of corn, toast, or other surfaces to which a spread is to be applied.

Various devices have been proposed for holding butter and for spreading it on hot cobs of corn, but these devices have been impractical; sometimes because of the inconvenience in using them and sometimes because of difficulty in cleaning them.

It is an object of the invention to provide an improved spreader which can be used for buttering corn on the cob, as well as for applying other spreads to the surfaces of other objects. One feature of the invention relates to a simplified construction which is economical to manufacture, convenient to use and easy to clean.

Another object of the invention is to provide a butter spreader which is quickly and conveniently loaded by merely pressing one end of a butter chamber into a bar or jar of butter, and without requiring removal of the piston or other means which are used for forcing the butter from the butter holder when in use.

One feature of the invention relates to a construction of the butter chamber with thin sides that will slice into the butter when the chamber is being filled, but which are reinforced without interfering with their slicing function. The apparatus of this invention can be filled and can be used for spreading its contents by measures which require the use of only one hand. This leaves the other hand free for holding the object being spread on, when this is desirable of neccessary.

Other objects, features and advantages of the invention will appear or be pointed out as the description proceeds.

In the drawing, forming a part hereof, in which like reference characters indicate corresponding parts in all the views:

Figure 1 is a side elevation of a butter spreader made in accordance with this invention;

Figure 2 is a top plan view of the butter spreader shown in Figure 1;

Figure 3 is a sectional view taken on the line 3—3 of Figure 1;

Figure 4 is a face view of the butter chamber, the view being taken on the line 4—4 of Figure 1; and Figure 5 is a sectional view taken on the line 5—5 of Figure 1.

The apparatus shown in the drawing is particularly intended for, and will be described as, a butter spreader, but it will be understood that the invention can be used for other spreads of a consistency similar to butter, and even when the spread is of a substantially different consistency. The device includes a body portion 10 having a butter holder 11 at one end and a grip portion 12 at the other end.

At an intermediate location, between the ends of the grip portion 12, there is a recess 15 with a socket 16 in its vertical face. A plunger 18 is connected to one end of a plunger frame 20; and the other end of the plunger frame extends into the recess 15 and has a stud 22 which fits into the socket 16. The plunger frame 20 swings about the axis of the socket 16, and the parts are so proportioned that the plunger 18 enters the open upper end of the butter holder 11 as the frame 20 swings about the axis of the socket 16. The plunger 18 has side edges 26 and 27 which are surfaces of revolution about the axis of the socket 16. The inside walls of the butter holder 11, along which the sides 26 and 27 move, are similarly shaped about the axis of the socket 16.

Further clockwise movement of the plunger frame 20, about the axis, causes the plunger to travel downwardly in the butter holder 11 so as to displace butter from the holder through an open lower end of the holder. This movement is imparted to the plunger frame 20 by pressing the thumb against a lug 30 which projects upwardly from the frame 20, near the rearward end of the frame and in a convenient position to be reached by the thumb of a hand holding the grip portion 12.

The convenient removal of the plunger frame 20 from the body portion 10 facilitates the washing and cleaning of the apparatus after use. In order to hold the parts assembled during use, however, there is a ridge 33 extending upwardly above the vertical face of the recess 15 and constituting a continuation of that vertical face. The plunger frame 20 has a channel 35, best shown in Figure 3, which extends across the ridge 33 and down the other side of the ridge so as to prevent transverse displacement of the plunger frame 20. This prevents the stud 22 from being pulled out of the socket 16 when the apparatus is in use.

Referring again to Figure 1, it will be evident that the ridge 33 terminates at an intermediate location between the sides of the recess 15 so that when the plunger frame 20 is swung rearwardly (clockwise), as far as possible in Figure 1, the channel in the plunger frame moves beyond the end of the ridge 33 and no longer prevents removal of the plunger frame from the socket 15.

Figure 2 shows a top plan view of the spreader and illustrates the knurled top surface of the lug 30. The plunger 28 is in a position to expose a portion of the interior of the butter holder 11, and illustrates the narrow width of the side walls 38 of the butter holder. These side walls may be made of sheet metal or thin plastic, or other thin material which will cut butter. If the walls 38 are sufficiently thin, it is not necessary that their lower edges be sharpened in order to cut into the butter when filling the holder.

The butter holder 11 also has a forward wall 40 and a rearward wall 41 (Figure 4) constructed of the same thin material as the side walls 38, and preferably of one-piece construction with the side walls 38. These side walls 38, 40 and 41 are reinforced against bending by the connection of the back wall 41 to the body portion 10 and by grid elements 44 connected to an intermediate portion of each of the side walls at the lower end of the butter holder.

These grids 44 serve the additional function of preventing the butter from falling out of the holder. They have upper faces which are of substantial width, as shown in Figure 5, and they have wedge-shaped cross sections so that they will cut through the butter when the butter holder is pressed into a mass of butter for reloading the butter holder. The side walls cut into the butter by virtue of their narrow width, and the grids 44 cut into the butter because of their sharpened lower edges. As the butter passes upwardly beyond the wide upper surfaces of the grids 44, it comes together so that the grids offer a resistance to movement of the butter downwardly in the butter holder. However, sufficient pressure can conveniently be applied to the plunger to force the butter outwardly around the grids when using the invention to spread the butter.

What is claimed is:

1. A device for spreading butter or the like, including a butter holder consisting of a plurality of side walls enclosing a space of substantially uniform cross section throughout its length, the space being open at its upper end, and open at its lower end except for narrow connecting means extending across said lower end and between side walls of the space for supporting a mass of butter in the space, the side walls being constructed of stiff sheet material for cutting into a mass of butter, a body portion of the device with one end connected to the butter holder, a plunger that fits the space in the holder as a piston, a frame connected to the piston, and a pivot connection between the frame and the body portion and near one end of the frame and around which the frame swings to move the plunger up and down within the holder, the inside faces of the holder being shaped to correspond to the paths of movement of the edges of the plunger as the plunger swings about the axis of the pivot connection, the body portion having a handle on the side remote from the holder, and a pressure lug on the frame near the pivot end of the frame and in position to be pressed by the thumb of a hand which is gripping the handle.

2. The spreading device described in claim 1, and in which said connecting means are bars extending in different directions between different side walls of the holder for providing a distribution of the support for the butter over the bottom face of a mass of butter in the holder, and in which the frame is connected with the body portion of the device by a pivot pin extending into a socket.

3. The spreading device described in claim 1, and in which all of the walls of the holder are of one-piece construction with one another, and said connecting means are bars extending across the bottom of the holder between different walls to provide distributed support over the bottom face of a mass of butter in the holder, the body portion and handle of the device also being of one-piece construction with the side walls and in which the frame is connected to the body portion by a pivot pin extending into a socket.

4. A device for spreading butter or the like comprising a holder for the butter consisting of a plurality of side walls enclosing a space which is open at its upper end and at least partially open at its lower end, a body portion by which the holder is carried, a plunger that fits the space within the holder and that is movable in the holder in the manner of a piston, a frame connected to the plunger, a detachable pivot connection between the frame and the body portion, and means for preventing detachment of the pivot connection when the frame is within the angular range of movement, that locates the plunger in the holder, said means including a ridge and groove, which engage with one another and one of which is formed on the frame and the other of which is formed on the body portion, the ridge and groove being angularly movable with respect to one another about the axis of said pivot connection and in a direction that withdraws the plunger from the top of the holder and into a position where the ridge and groove no longer engage with one another to prevent detachment of the pivot connection.

5. The device for spreading butter or the like, as described in claim 4, and in which the frame has an end portion which is connected to the body portion of the device within a recess in the side and top of the body portion, the recess being open through one side of the body portion for the removal of the frame from the body portion in the direction of the axis of the pivot connection, and the forward and rearward ends of the recess having faces that serve as abutments for limiting the angular movement of the frame about the pivot connection.

6. The device for spreading butter or the like, as described in claim 4, and in which the frame extends into a recess formed in the top and one side of the body portion, and in which the pivot connection includes a stud on the frame extending into a bore in the side wall of the recess in a direction extending toward the open side of the recess so that the pivot connection between the frame and the body portion can be disconnected by moving the frame out through the open side of the recess.

7. A device for spreading butter or the like including a holder for the butter consisting of a plurality of side walls enclosing a space of substantially uniform cross section, said space being open at its upper end and at least most of the cross-section of the lower end being also open, a body portion of the device extending from the holder and having a handle at one end remote from the holder, a plunger that fits within the holder like a piston, a frame connected to the plunger, a pivot connection joining the frame to the body portion at the end of the handle which is nearer to said hoder, the inside faces of the butter holder being shaped to the paths of the edges of the plunger as they swing about the axis of said pivot connection, and a pressure lug on the frame near the pivot end of the frame and in position to be pressed by the thumb of a hand which is gripping the handle.

References Cited in the file of this patent

UNITED STATES PATENTS

| | | |
|---|---|---|
| 254,631 | Fisher | Mar. 7, 1882 |
| 791,917 | Koeth | June 6, 1905 |
| 846,629 | Sulteen | Mar. 12, 1907 |
| 1,213,655 | Keil | Jan. 23, 1917 |
| 1,293,304 | Beard | Feb. 4, 1919 |
| 1,537,695 | Riley | May 12, 1925 |
| 1,725,229 | Tronc | Aug. 20, 1929 |
| 1,893,889 | Guerini | Jan. 10, 1933 |
| 2,632,661 | Cristofv | Mar. 24, 1953 |

FOREIGN PATENTS

| | | |
|---|---|---|
| 15,492 | Great Britain | July 28, 1899 |